A. JENSON.
LITTER CARRIER.
APPLICATION FILED MAY 23, 1908.

911,558.

Patented Feb. 2, 1909.
2 SHEETS—SHEET 2.

Witnesses.
Harry Opsahl.
W. H. Souba.

Inventor.
August Jenson.
By his Attorneys.
Williamson Merchant

UNITED STATES PATENT OFFICE.

AUGUST JENSON, OF KENYON, MINNESOTA, ASSIGNOR TO THE STANDARD CARRIER COMPANY, OF KENYON, MINNESOTA, A CORPORATION OF MINNESOTA.

LITTER-CARRIER.

No. 911,558.　　　Specification of Letters Patent.　　　Patented Feb. 2, 1909.

Original application filed March 14, 1908, Serial No. 421,131. Divided and this application filed May 23, 1908. Serial No. 434,573.

*To all whom it may concern:*

Be it known that I, AUGUST JENSON, a citizen of the United States, residing at Kenyon, in the county of Goodhue and State of Minnesota, have invented certain new and useful Improvements in Litter-Carriers; and I do hereby declare the following to be a full, clear, and exact description of the invention, such as will enable others skilled in the art to which it appertains to make and use the same.

My invention relates particularly to that class of carriers generally designated as litter carriers, and is in the nature of a division of my pending application Serial Number 421,131, filed March 14, 1908, entitled "Litter carrier."

The present invention is directed chiefly to the improvement of the means for locking the pivoted bucket and for tripping the same, and to such ends the invention consists of the novel devices and combinations of devices hereinafter described and defined in the claims.

In the accompanying drawings which illustrate the invention, like characters indicate like parts throughout the several views.

Figure 1:
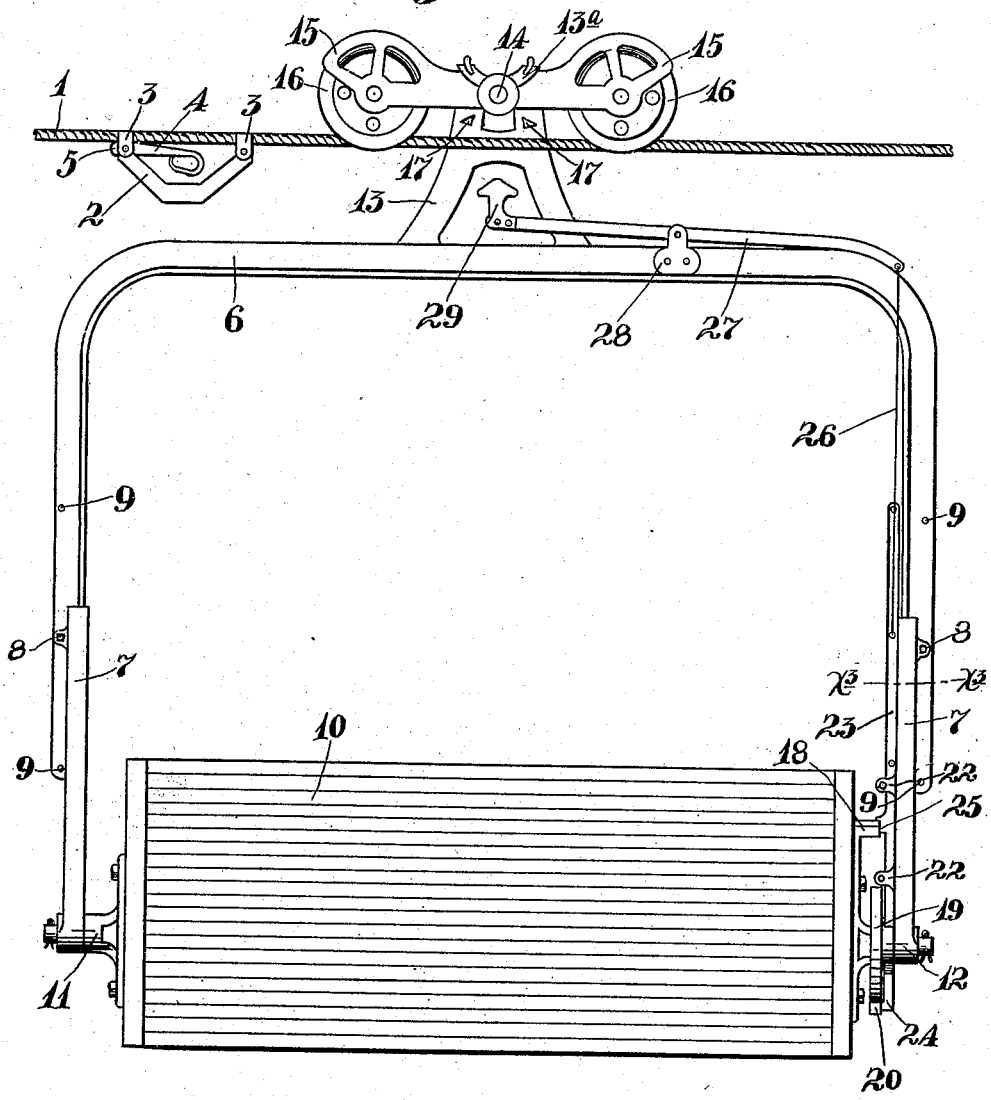
Figure 2:
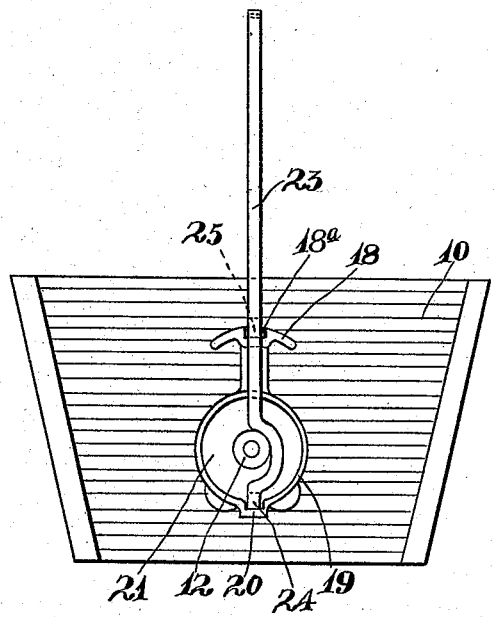
Figure 3:
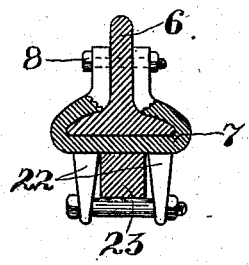

Referring to the drawings, Figure 1 is a view in side elevation, showing the improved litter carrier. Fig. 2 is an end elevation showing the bucket and lock mechanism of the litter carrier; and Fig. 3 is a transverse section taken on the line $x^3$ $x^3$ of Fig. 1.

The overhanging track, which may be assumed to be in the form of a wire cable, but which may be of any suitable construction, is indicated by the numeral 1. Adjustably mounted on this cable is a tripping abutment shown as in the form of a downwardly bowed cam bar 2 having U-shaped end portions or yokes 3 that loosely embrace the cable. Pivoted to one end of the bar 2 is a lock lever 4 having an eccentric end 5 adapted to be turned into clamping engagement with the cable 1 to lock said tripping abutment in any desired position on said cable.

As shown, the carrier frame is made up chiefly of a strong yoke 6, bent from T-iron, and leg extensions 7 are applied to and depend from the down-turned legs of said yoke 6. These leg extensions 7 are preferably channeled at their upper portions so that they fit and are telescopically adjustable on the legs of said yoke, and they are adapted to be rigidly but adjustably secured thereto by short nutted bolts 8 adapted to be passed through any of several perforations 9 formed in the outwardly extended flanges of the said yoke.

The bucket 10 has trunnions 11 and 12 secured to the ends thereof below its center of gravity; and these trunnions are journaled in the lower ends of the leg extensions 7.

Rigidly secured centrally to the transverse upper portion of the yoke 6 is a hanger bracket 13 having a laterally and downwardly turned upper end $13^a$ through which and the upper side portions of said track a pivot bolt 14 is passed. The particular form of the bracket 13 and the particular arrangement of wheels for supporting the carrier are not herein claimed, as these features are the subject matter of the pending application above identified; but further describing the construction illustrated, wheel supporting arms 15 are pivoted on the bolt 14, and grooved truck wheels 16 are journaled to the free ends of these arms. Fig. 1 illustrates the normal position of the arms and wheels in supporting the carrier from the track cable 1. The hanger bracket 13 is shown as provided with stop lugs 17 that limit the downward movement of the arms 15 when the carrier is raised in respect to the track.

Rigidly secured, as shown, to the bucket trunnion 12 is a notched latch lever 18 and a latch rim 19. The latch rim 19, so-called, has a single lock notch 20 which is preferably located diametrically opposite to the notch $18^a$ of the latch segment 18, and the remaining portion of the said rim 19 extends concentric to the axis of the trunnion 12. As shown, the rim 19 is formed integral with a disk-like body 21 that is rigidly secured directly to the said trunnion 12.

Mounted to slide vertically through keeper guides 22, as shown, on the right hand leg extension 7, is a latch bar 23. At its extreme lower end this latch bar is provided with a laterally offset lock lug 24 that is adapted to engage with a notch 20 of the latch rim 19; and further up it is provided with a laterally offset lug 25 that is adapted to be engaged with a notch $18^a$ of the segment 18. Just above the lock lug 20, the latch bar 23 is offset to clear the trunnion 12. The upper end of said bar 23 is connected, as shown, by a light rod or stiff wire 26, to the end of a latch tripping lever 27 that is intermediately pivoted to a bearing 28 on the transverse portion of the frame yoke 6. At its inner end, the tripping lever 27 is provided with a reversely beveled cam head 29 that is adapted to engage the downwardly bowed or reversely beveled tripping bar or abutment 2.

Normally, or when the bucket is in its upright position, said bucket is locked by engagement of the lock lugs 24 and 25 of the lock bar 23, respectively, with the notches 20 and 18ª; and in this position of the lock bar, the cam head 29 of the tripping lever 27 is raised into such position that it will, at the proper point of travel of the carrier, engage with and be depressed by said cam bar or tripping abutment 2. When the cam head 29 is thus forced downward, the lock bar 23 will be raised into a position to release the carrier bucket and thus permit the carrier bucket to be turned upside down and to dump its load.

The initial movement of the bucket from its upright to its normal position causes the lug 24 of the lock bar 23 to ride upon the flange or concentric portion of the rim 19, and this rim will then hold said lock bar 23 raised and the head 29 of the tripping lever 27 lowered until the bucket has been again turned into its upright or normal position. It therefore follows that with this device the tripping head 29 of the lever 27 will be held in a lowered position so that it will clear or pass under the cam bar 2 when the carrier is making its return movement; and this, as is evident, makes unnecessary a pivoted or yielding tripping abutment on the track cable. Furthermore, the device described gives a double lock for the bucket, to-wit, one interlocking engagement between the lug 24 and notch 20, and another interlocking engagement between the lug 25 and notch 18ª.

What I claim is:

1. In a carrier system, the combination with an elevated track and a relatively fixed tripping abutment, of a carrier frame having a pivoted bucket and provided with truck wheels arranged to run on said track, a latch for securing said bucket in an operative position, a latch tripping connection having a tripping head positioned for action on said tripping abutment when said bucket is in an operative position, and automatic means for holding said tripping head in a position to clear said tripping abutment when the said bucket is turned from its operative position, substantially as described.

2. In a carrier system, the combination with an elevated track and a relatively fixed tripping abutment, of a carrier frame having a pivoted bucket and provided with truck wheels arranged to run upon said track, a notched lock segment and a lock bar retaining flange secured to one end of said bucket, said flange extending concentric to the pivotal support of said bucket and having a lock notch, a sliding lock bar engageable with the notches of said lock segment and retaining flange when the bucket is in operative position, a tripping lever pivoted to the carrier frame and having a tripping head for coöperation with said tripping abutment, and a connection between said tripping lever and said lock bar, and which retaining flange operates on said lock bar to hold the tripping head of said tripping lever in a position to clear said tripping abutment when said bucket is turned from its operative position, substantially as described.

3. In a carrier system, the combination with an elevated track, of a carrier frame having truck wheels arranged to run on said track, a bucket pivotally supported by said carrier frame, a lock device secured to one end of said bucket and having lock notches located one above and one below the pivotal connection between said bucket and frame, and a sliding lock bar adapted to engage the said two lock notches when the bucket is in an operative position, substantially as described.

4. In a carrier system, the combination with an elevated track, of a carrier frame having wheels arranged to run on said track, a bucket pivoted to said frame, a latch retaining rim extended concentric to the pivotal connection between said bucket and frame and having a lock notch, and a latch or lock bar engageable with the notch of said flange to lock said bucket in an operative position, the concentric portion of which flange serves to hold said latch or lock bar in an inoperative position when said bucket is turned from its operative position, substantially as described.

In testimony whereof I affix my signature in presence of two witnesses.

AUGUST JENSON.

Witnesses:
ANDREW LINSTNER,
MARTIN W. FOX.